(12) United States Patent  (10) Patent No.: US 7,443,049 B1
Jones et al.  (45) Date of Patent: Oct. 28, 2008

(54) BI-DIRECTIONAL INVERTER CONTROL FOR HIGH VOLTAGE CHARGE/DISCHARGE FOR AUTOMOBILES

(75) Inventors: James L Jones, Belleville, MI (US); Sam Y Guo, Canton, MI (US); Chidambarakrishnan L Rajesh, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 505 days.

(21) Appl. No.: 11/195,794

(22) Filed: Aug. 2, 2005

(51) Int. Cl.
 *B60L 1/00* (2006.01)
(52) U.S. Cl. ........................................................ 307/9.1
(58) Field of Classification Search .................... 307/9.1
 See application file for complete search history.

(56) References Cited

U.S. PATENT DOCUMENTS

| | | | |
|---|---|---|---|
| 3,466,453 A | 9/1969 | Greenberg | |
| 4,079,304 A | 3/1978 | Brandenburg | |
| 4,157,492 A | 6/1979 | Colbrese | |
| 4,277,692 A * | 7/1981 | Small | 307/66 |
| 4,366,430 A | 12/1982 | Wright | |
| 4,617,506 A | 10/1986 | Bogie et al. | |
| 4,726,786 A | 2/1988 | Hill | |
| 4,885,524 A | 12/1989 | Wilburn | |
| 5,697,810 A | 12/1997 | Barry | |
| 5,766,020 A | 6/1998 | Hughes | |
| 5,936,381 A | 8/1999 | Suh | |
| 5,965,998 A | 10/1999 | Whiting et al. | |
| 7,145,788 B2 * | 12/2006 | Plummer | 363/141 |
| 2004/0062059 A1 | 4/2004 | Cheng et al. | |
| 2004/0145340 A1 | 7/2004 | Horenstein | |

* cited by examiner

*Primary Examiner*—Robert L. Deberadinis
(74) *Attorney, Agent, or Firm*—Harness, Dickey & Pierce, P.L.C.

(57) ABSTRACT

A charging system for a battery of a vehicle comprises an electrical interface module that includes first and second electrical interfaces. An inverter module communicates with the electrical interface module and the battery and has a first state and a second state. In the first state, the inverter module allows the battery to be charged through the first electrical interface when a voltage source is connected to the first electrical interface, the vehicle is off, and a charge level of the battery is less than a threshold. In the second state, the inverter module allows the battery to provide power to the second electrical interface when a voltage source is not connected to the first electrical interface, the vehicle is on, and/or the charge level of the battery is greater than or equal to the threshold.

24 Claims, 6 Drawing Sheets

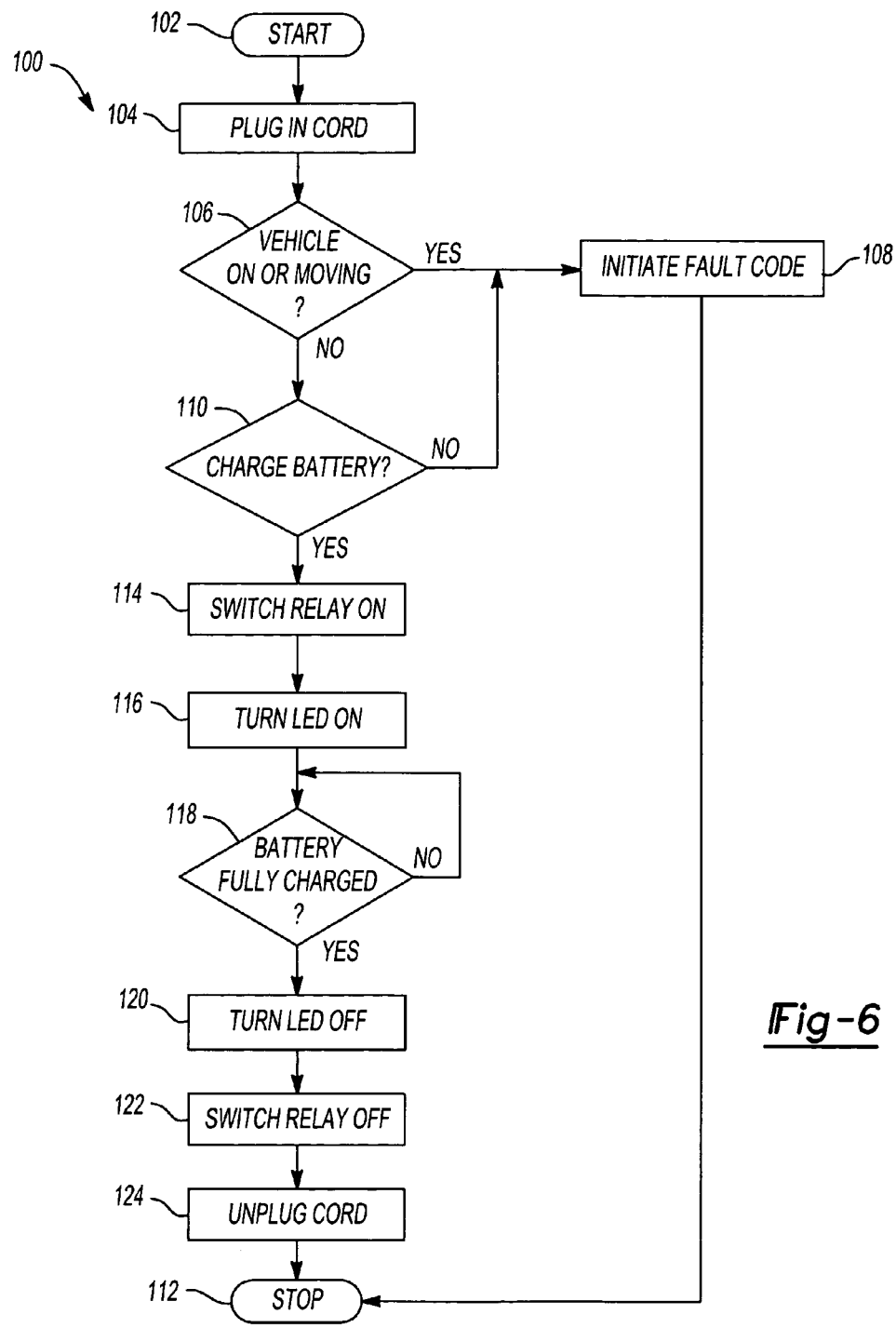

BI-DIRECTIONAL INVERTER CONTROL FOR HIGH VOLTAGE CHARGE/DISCHARGE FOR AUTOMOBILES

FIELD OF THE INVENTION

The present invention relates to a vehicle electrical system, and more particularly to interfacing with a vehicle electrical system through an inverter.

BACKGROUND OF THE INVENTION

Automotive vehicles typically include an exhaustible electrical power source. The power source, such as a DC voltage battery, provides electrical energy to assist in the starting of the vehicle. After the vehicle starts, other elements of the electrical system provide any requisite electrical energy to the vehicle. The electrical system recharges the battery during vehicle operation. In this manner, the electrical charge of the battery is maintained at a sufficient level for starting the vehicle.

In certain circumstances, the charge of the battery may decrease to a level that is insufficient for starting the vehicle. For example, when the engine of the vehicle is off, the battery may power one or more electrical devices of the vehicle, such as a radio, headlights, and/or interior lights, thereby draining the charge of the battery. Extreme temperatures (high or low) and/or cycling may also degrade charge retention capabilities of the battery. One or more methods may be used to recharge the battery for purposes of starting the vehicle. For example, terminals of the drained battery may be connected to terminals of a second battery via a pair of cables. An electrical system of a vehicle that includes the second battery is used to start the vehicle that includes the drained battery. Alternatively, an external device may be used to charge the drained battery.

SUMMARY OF THE INVENTION

A vehicle comprises a power source for powering the vehicle. An electrical system is connected to the power source, the electrical system includes a battery. A first portion of the electrical system is electrically coupled to the battery and configured to supply electrical power from the battery to at least one electrical device associated with the vehicle. The electrical system further includes a second portion with an electrical interface module and an inverter module. The electrical interface module includes a first electrical interface and a second electrical interface. The inverter module is electrically coupled to the electrical interface module and the battery and is operable in a first state and a second state. In the first state, the inverter module permits the battery to be charged through the first electrical interface, the power source is off, and a charge level of the battery is less than a predetermined charge threshold. In the second state, the inverter module permits the battery to provide electrical power that is output from the electrical interface module through the second electrical interface when the source of electrical power is not coupled to the first interface, the power source is on, the charge level of the battery is greater than or equal to the predetermined charge threshold, and combinations thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a flowchart that illustrates steps of a charging method according to the present invention.

DETAILED DESCRIPTION OF THE PREFERRED EMBODIMENTS

Figure 1:
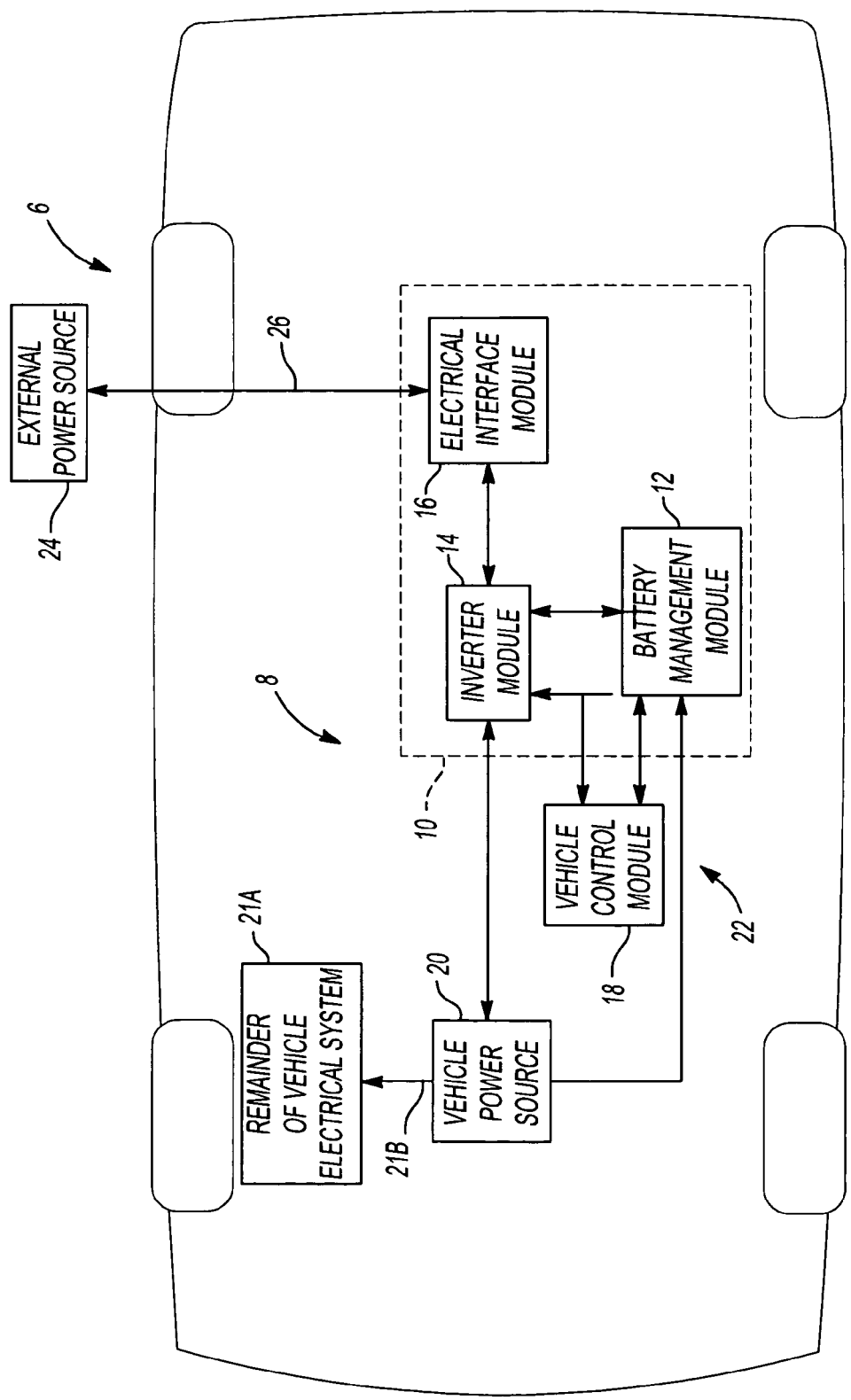
FIG. 1 is a functional block diagram of a vehicle electrical system interface according to the present invention.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

The present invention provides the capability of interfacing between a vehicle electrical system and conventional AC power outlets and power cords. For example, the vehicle electrical system may interface with home, commercial building, and/or other vehicle electrical systems. Referring now to FIG. 1, a vehicle 6 includes a vehicle electrical system 8. The vehicle electrical system 8 includes a vehicle electrical system interface 10 according to the present invention. The vehicle electrical system interface 10 includes a battery management module 12, an inverter module 14, and an electrical interface module 16. The interface 10 communicates with a vehicle control module 18 and a vehicle power source, such as a battery 20. For example, the battery 20 is a DC voltage power source and can provide electrical power to a remainder 21a of the vehicle electrical system 8 (e.g. headlamps, interior lamps, instrument panel, radio, and window and seat motors) via a conventional wiring system 21b.

In the present implementation of the invention, the interface 10 uses an existing vehicle communication network 22 (e.g. a data communication bus) to provide communication means between the battery management module 12, the inverter module 14, and the vehicle control module 18. The electrical interface module 16 can communicate with an external power source 24. For example, the external power source 24 may be an AC electrical system of a home or other building. Alternatively, the external power source 24 may be an electrical system of a second vehicle. Preferably, the electrical interface module 16 can communicate with the external power source 24 using conventional electrical communication means 26.

The inverter module 14 allows charging of, and/or powering from, the battery 20 through the electrical interface module 16. In other words, the interface 10 may charge the battery 20 from the external power source 24 through the inverter module 14. Alternatively, the interface 10 may provide power to the external power source 24 and/or another external device from the battery 20. The battery management module 12 communicates with the battery 20 to determine a charge status of the battery 20. For example, the battery management module 12 may transmit information that indicates whether the battery 20 is charging or is at a full charge status to the inverter module 14. The vehicle control module 18 communicates with one or more vehicle components to determine a status of the components and/or the vehicle. For example, the vehicle control module 18 can determine whether the vehicle is turned ON or OFF. In the present implementation, the vehicle is ON when the engine is running, thereby allowing the vehicle electrical system to provide power without draining the battery 20. The vehicle is OFF when the engine is NOT running, and the only source of electrical power is the existing battery charge. The vehicle control module 18 transmits relevant status information to the inverter module 14 and the battery management module 12.

The inverter module 14 operates according to the status information that the battery management module 12 and/or the vehicle control module 18 transmit to the inverter module 14. For example, when the vehicle is turned ON, the inverter module 14 can permit the powering of external devices (i.e. devices that are not fixedly mounted to the vehicle and/or directly coupled to the battery 20 via the conventional wiring system 21b) from the battery 20 (i.e. discharging). The inverter module 14 may prevent the charging of the battery 20 when the vehicle is turned ON. Conversely, when the vehicle is turned OFF, the inverter module 14 may discontinue the powering of external devices from the battery 20 to prevent further draining of the battery 20. In another implementation, the inverter module 14 may discontinue powering from the battery 20 when a charge status of the battery 20 decreases below a threshold. The inverter module 14 can permit the charging of the battery 20 from external devices when the vehicle is turned OFF.

Figure 2:
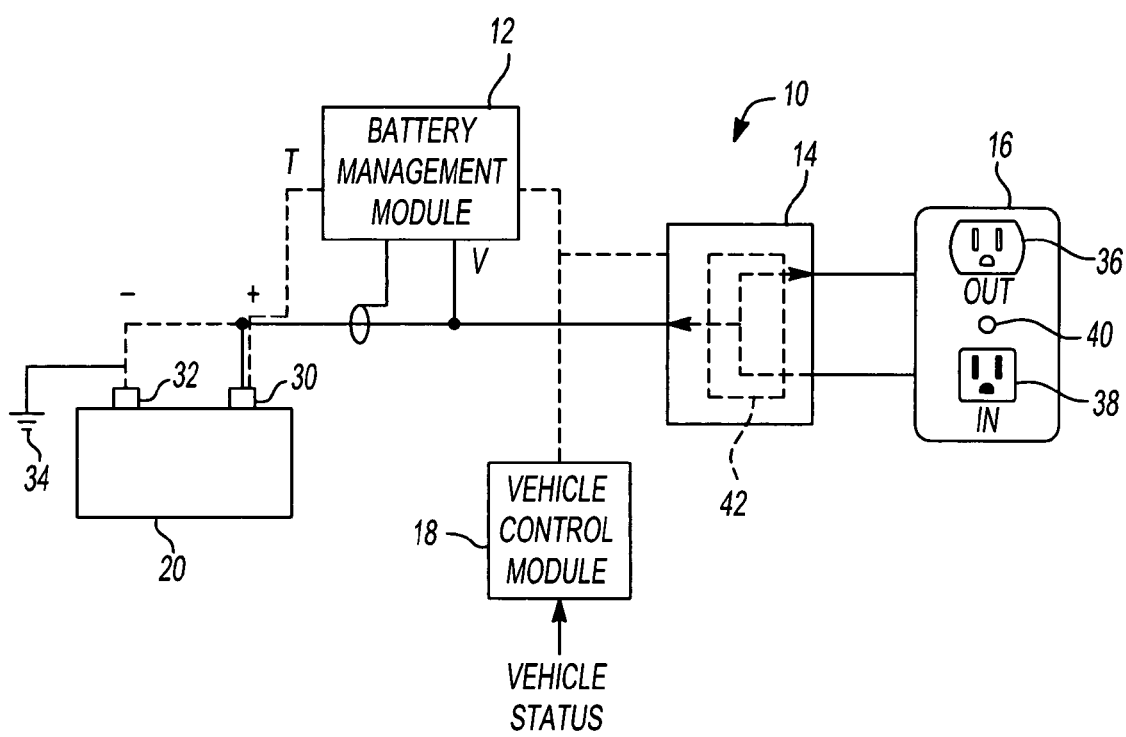
FIG. 2 is a functional block diagram of the vehicle electrical system interface including an AC outlet interface according to the present invention.

Referring now to FIG. 2, an exemplary implementation of the vehicle electrical system interface 10 is shown in further detail. The battery management module 12 communicates with a first (e.g. positive) terminal 30 of the battery 20. The second (e.g. negative) terminal 32 communicates with ground 34. In this manner, the battery management module 12 is able to monitor the status of the battery 20 and communicate the information to the inverter module 14 as described above. The inverter module 14 can be a bi-directional inverter, which is able to receive and/or output an electrical signal. In the present implementation, the inverter module 14 sends/receives DC and/or AC electrical power signals.

The electrical interface module 16 is an AC power outlet that can include a first outlet 36 for discharging from the battery 20 and a second outlet 38 for charging to the battery 20. The first outlet 36 is configured as a female socket interface and the second outlet 38 is configured as a male plug interface. In this manner, interchanging the charging/discharging operations may be prevented. One or more LED indicators 40 provide visible status information to a user. For example, the LED indicator 40 may indicate the charge status and/or fault codes.

In the present implementation, the inverter module 14 defaults to an output (i.e. discharging) mode. The inverter module 14 includes a sense circuit 42 that enables the inverter module 14 in the output mode or an input (i.e. charging) mode. When the sense circuit 42 determines that a connection is made to the second outlet 38, the sense circuit 42 switches the inverter module 14 to the input mode. In the input mode, the battery 20 is in a charging status and the LED indicator 40 is ON. When the battery 20 is fully charged, the LED indicator 40 is OFF.

Figure 3:
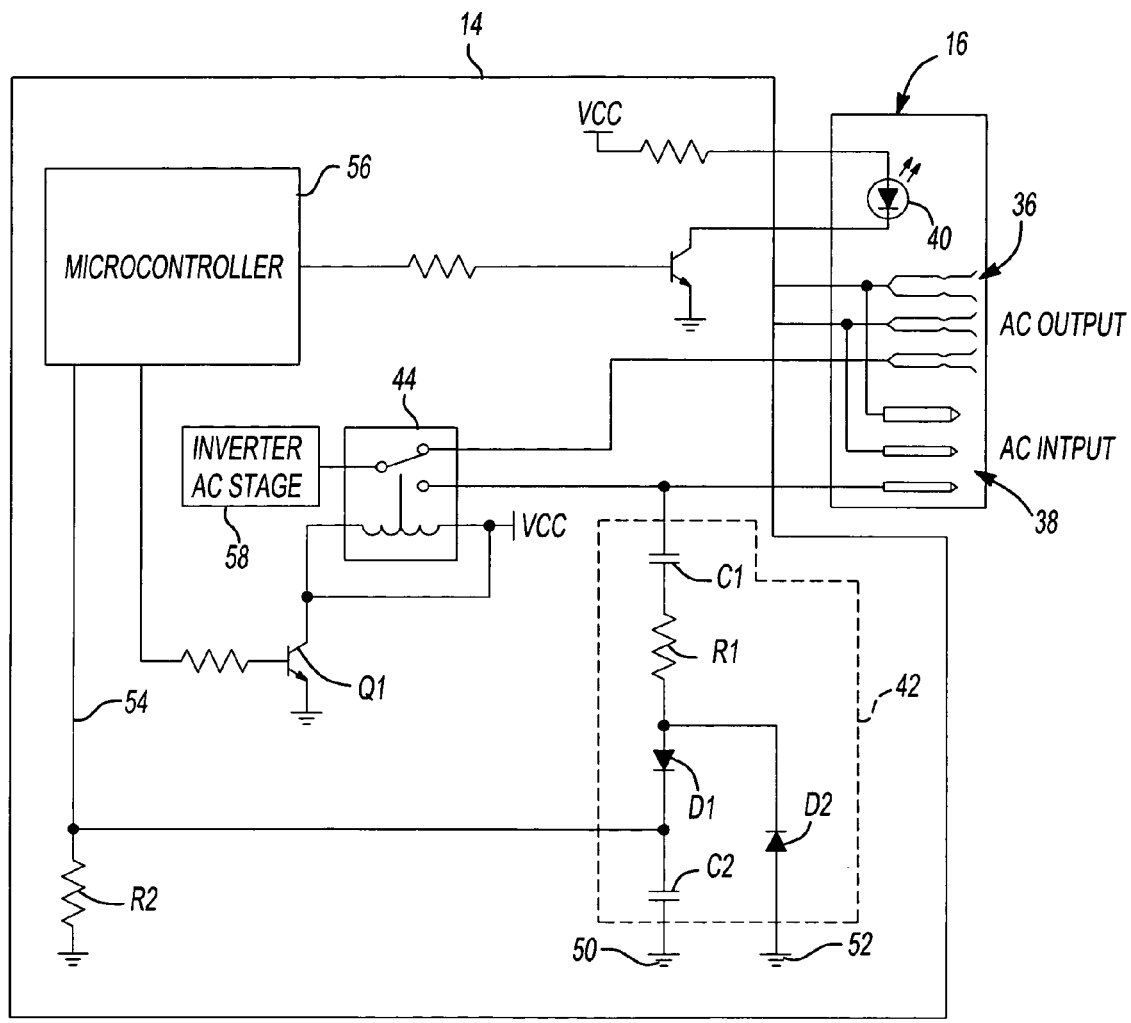
FIG. 3 is a circuit schematic of an interface module according to the present invention.

Referring now to FIG. 3, an exemplary implementation of the inverter module 14 and the sense circuit 42 is shown in further detail. In the output mode, a relay 44 is not energized, preventing electrical communication between the inverter module 14 and the second outlet 38 and allowing electrical communication between the inverter module 14 and the first outlet 36. In other words, the inverter module 14 is configured to provide power to the first outlet 36.

The sense circuit 42 includes capacitors C1 and C2, a resistor R1, and diodes D1 and D2 and determines when a connection is made to the second outlet 38. The capacitors C1 and C2, the resistor R1, and the diode D1 act as an AC active voltage divider. The capacitor C1 exhibits a relatively large AC voltage drop, but does not consume power. During a positive half cycle of an AC signal (i.e. an AC signal received at the second outlet 38), the diode D1 conducts current between the second outlet 38 and ground node 50, charging the capacitor C1. During a negative half cycle of the AC signal, the diode D2 conducts current between the second outlet 38 and ground node 52. Those skilled in the art can appreciate that other suitable electrical devices may be used In this manner, and in further combination with a resistor R2, the sense circuit 42 ensures that a sense input 54 of a microcontroller 56 is at ground potential when the second outlet 38 is not receiving an AC signal. When the sense input 54 is at ground potential, the microcontroller 56 turns transistor Q1 OFF. When the transistor Q1 is OFF, the relay 44 is not energized. Conversely, when the second outlet 38 is receiving an AC signal, the sense input 54 is at approximately 5V, DC. The microcontroller 56 turns transistor Q1 ON. When the transistor Q1 is ON, the relay 44 is energized, forming a connection between the second outlet 38 and an inverter AC stage 58. In the input mode, the inverter AC stage 58 converts the AC electrical signal to a signal suitable for charging the battery 20. In the output mode, the inverter AC stage 58 converts a DC signal from the battery 20 to an electrical signal suitable for powering external devices via the first outlet 36.

The microcontroller 56 further operates according to vehicle and battery status information, in combination with the sense input 54. For example, when the vehicle is turned OFF and the battery 20 is not at full charge, the microcontroller 56 energizes the relay 44. When the battery 20 is at full charge, the microcontroller 56 may de-energize the relay to prevent overcharging, regardless of the status of the sense input 54. The microcontroller 56 powers the LED indicator 40 accordingly. For example, the microcontroller 56 turns the LED indicator 40 ON when the battery 20 is charging, and turns the LED indicator 40 OFF when the battery 20 is not charging.

Although the inverter module 14 is configured to de-energize (i.e. open) the relay 44 when the battery 20 is at full charge, damage to one or more circuit elements may prevent the relay 44 from opening. In this manner, the sense input 54 may continue to indicate 5V to the microcontroller 56 regardless of the mode of the inverter module 14. The microcontroller 56 may turn the LED indicator 40 ON and OFF to indicate a fault mode to the user. In another implementation, the microcontroller 56 may be external to the inverter module 14. For example, either of the battery management module 12 and/or the vehicle control module 18 may incorporate one or more of the functions of the microcontroller 56.

Figure 4:
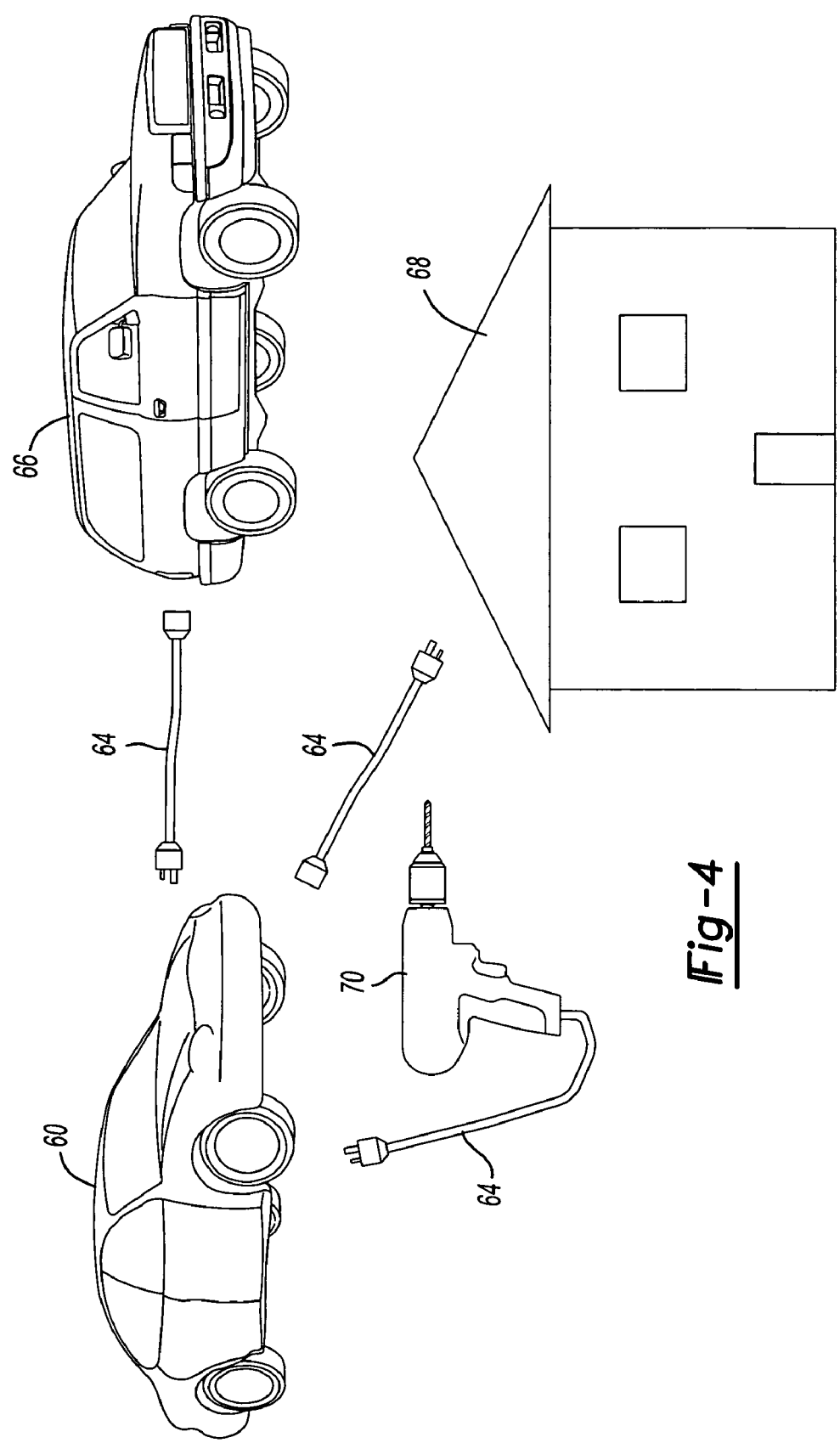
FIG. 4 illustrates device connection configurations according to the present invention.

Referring now to FIG. 4, possible configurations between a vehicle 60 that includes the interface 10 and one or more external devices are shown. In a first exemplary use, the vehicle 60 uses a conventional electrical cord 64 to provide power to a second vehicle 66 that is also equipped with an interface 10. For example, the vehicle 60 may charge a battery of the second vehicle 66. Alternatively, the second vehicle 66 may charge the battery of the vehicle 60. Those with ordinary skill in the art can appreciate that although the interface 10 associated with the vehicle 60 is configured to output A/C electrical power in the example provided, the interface 10 could be configured to output and/or receive DC electrical power. In a second exemplary use, the vehicle 60 receives power from the electrical system of a home 68 or other building to charge the vehicle battery or power other vehicle electrical devices. In a third exemplary use, the vehicle 60 provides power to an external electrical device 70 such as a power tool or radio.

Figure 5:
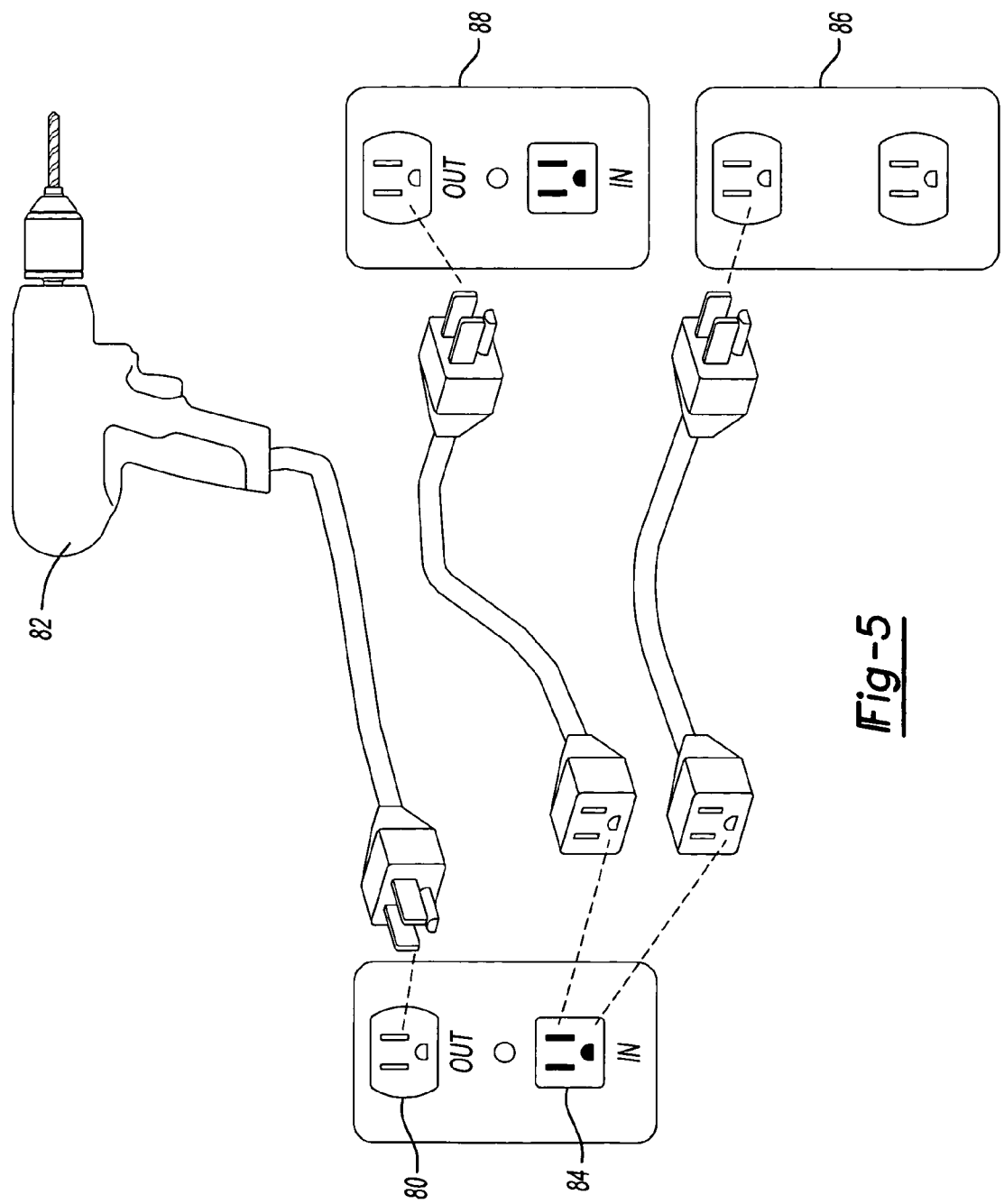
FIG. 5 illustrates AC outlet configurations according to the present invention.

Referring now to FIG. 5, outlet configurations of the above exemplary uses are described. A female outlet 80 is used to provide power to an external device 82 or charge/start a second vehicle. A male outlet 84 is used to receive power/charge from a home power outlet 86 and/or a second vehicle outlet 88. Those skilled in the art can appreciate that other suitable configurations and/or uses are possible.

Referring now to FIG. 6, the present invention implements an exemplary charging method 100. The method 100 starts in step 102. In step 104, a user plugs a power cord into an input interface of the vehicle and an output interface of a second vehicle or home. In step 106, the method 100 determines the status of the vehicle. For example, the method 100 determines whether the vehicle is moving or ON. If true, the method 100 continues to step 108. If false, the method 100 continues to step 110. In step 108, the method 100 initiates a fault code (e.g. a blinking LED indicator) and terminates in step 112. In step 110, the method 100 determines the status of the battery. For example, the method 100 determines whether the battery needs to be charged. If true, the method 100 continues to step 114. If false, the method 100 continues to step 108.

In step 114, the method 100 switches the inverter relay to accept AC input (i.e. the input mode). In step 116, the method 100 turns the LED indicator ON. In step 118, the method 100 determines whether the battery is fully charged. If true, the method 100 continues to step 120. If false, the method 100 repeats step 118. In other words, the method 100 continuously lights the LED indicator and determines the charge status of the battery until the battery reaches full charge. In step 120, the method 100 turns the LED indicator OFF. In step 122, the method 100 switches the inverter relay to the output mode. In step 124, the user unplugs the power cord. In another implementation, the LED indicator may blink if the power cord is not unplugged within a first period.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle comprising:
a power source for powering the vehicle;
an electrical system connected to the power source, the electrical system having a battery, a first portion which is electrically coupled to the battery and configured to supply electrical power from the battery to at least one electrical device associated with the vehicle, the at least one electrical device selected from a group consisting of exterior lights, interior lights, instrument panels, seat motors, window motors, and combinations thereof, the electrical system further including a second portion with an electrical interface module and an inverter module, the electrical interface module having a first electrical interface and a second electrical interface, the inverter module being electrically coupled to the electrical interface module and the battery and being operable in a first state and a second state, wherein operation of the inverter module in the first state permits the battery to be charged through the first electrical interface based on a determination that the power source is off, a source of electrical power is coupled to the first electrical interface, and a charge level of the battery is less than a predetermined charge threshold, and wherein operation of the inverter module in the second state permits the battery to provide electrical power that is output from the electrical interface module through the second electrical interface based on a determination that at least one of the source of electrical power is not coupled to the first interface, the power source is on, and the charge level of the battery is greater than or equal to the predetermined charge threshold.

2. A charging system for a battery of a vehicle, comprising:
an electrical interface module that includes first and second electrical interfaces; and
an inverter module that communicates with the electrical interface module and the battery and that has a first state and a second state,
wherein the inverter module is in the first state and allows the battery to be charged through the first electrical interface based on a determination that a voltage source is connected to the first electrical interface, the vehicle is off, and a charge level of the battery is less than a threshold, and wherein the inverter module is in the second state and allows the battery to provide power to the second electrical interface based on a determination that at least one of a voltage source is not connected to the first electrical interface, the vehicle is on, and the charge level of the battery is greater than or equal to the threshold.

3. The charging system of claim 2 further comprising a control module that communicates with the inverter module and that determines whether the vehicle is on or off.

4. The charging system of claim 3 wherein the first electrical interface is an AC input connection and the second electrical interface is an AC output connection.

5. The charging system of claim 2 wherein the electrical interface module is an AC power outlet.

6. The charging system of claim 2 further comprising a battery management module that communicates with the battery and the inverter module and that determines the charge level of the battery.

7. The charging system of claim 2 wherein the electrical interface module includes a visual indicator that is indicative of the charge level of the battery and indicative of whether the inverter module is in the first state or the second state.

8. The charging system of claim 7 wherein the visual indicator is a light emitting diode (LED).

9. The charging system of claim 8 wherein the LED is ON when the charge level is less than the threshold and the inverter is in the first state, and the LED is OFF when the charge level is greater than or equal to the threshold and the inverter is in the second state.

10. The charging system of claim 2 wherein the threshold is a maximum charge capacity of the battery.

11. The charging system of claim 2 wherein the inverter module includes a switching module, the switching module is closed when the inverter module is in the first state, and the switching module is open when the inverter module is in the second state.

12. The charging system of claim 11 wherein the switching module is a relay.

13. The charging system of claim 2 further comprising a sensing module that determines whether a voltage source is connected to the first electrical interface.

14. The charging system of claim 13 wherein the interface module includes the sensing module.

15. The charging system of claim 2 wherein the first electrical interface is a male connection and the second electrical interface is a female connection.

16. The charging system of claim 2 wherein the inverter module prevents the battery from charging when the inverter module is in the second state.

17. A charging system for a battery of a vehicle, comprising:
- an AC electrical outlet that includes an inlet connection and an outlet connection;
- a battery management module that determines a charge level of the battery;
- a vehicle status module that determines whether the vehicle is on or off; and
- an inverter module that communicates with the AC electrical outlet, the battery management module, the vehicle status module, and the battery, and that has a first state and a second state,
- wherein the inverter module is in the first state and allows the battery to be charged through the inlet connection based on a determination that a voltage source is connected to the first inlet connection, the vehicle is off, and a charge level of the battery is less than a threshold, and wherein the inverter module is in the second state and allows the battery to provide power to the outlet connection based on a determination that at least one of a voltage source is not connected to the inlet connection, the vehicle is on, and the charge level of the battery is greater than or equal to the threshold.

18. A method for charging a battery of a vehicle, comprising:
- determining whether a voltage source is connected to an inlet connection of the vehicle;
- determining whether the vehicle is off;
- determining whether a charge level of the battery is less than a threshold;
- switching an inverter module from a first state to a second state based on a determination that the voltage source is connected to the inlet connection, the vehicle is off, and the charge level of the battery is less than the threshold;
- receiving a first voltage signal from the inlet connection while in the second state;
- converting the first voltage signal to a second voltage signal for charging the battery while in the second state; and
- charging the battery while in the second state.

19. The method of claim 18 further comprising turning a visual indicator ON while in the second state.

20. The method of claim 19 further comprising turning the visual indicator OFF while in the first state.

21. The method of claim 19 further comprising providing power to an outlet connection while in the second state.

22. The method of claim 21 further comprising providing an electrical communication path between the battery and the outlet connection while in the first state.

23. The method of claim 18 further comprising providing and electrical communication path between the battery and the inlet connection while in the second state.

24. The method of claim 18 further comprising preventing charging of the battery while in the first state.

* * * * *